United States Patent [19]

Li et al.

[11] Patent Number: 4,626,390
[45] Date of Patent: Dec. 2, 1986

[54] SELF-CRIMPED FOAMED FIBERS

[75] Inventors: Hsin L. Li, Parsippany; Theodore Largman; Hendrikus J. Oswald, both of Morristown, all of N.J.

[73] Assignee: Allied Corporation, Morris Township, Morris County, N.J.

[21] Appl. No.: 688,494

[22] Filed: Jan. 3, 1985

[51] Int. Cl.[4] ...................... B29C 47/06; B29C 67/20
[52] U.S. Cl. .................. 264/46.1; 264/45.5; 264/53; 264/54
[58] Field of Search ................ 264/45.5, 53, 54, 168, 264/45.9, 46.1

[56] References Cited

U.S. PATENT DOCUMENTS

| | | | |
|---|---|---|---|
| 3,009,309 | 7/1956 | Breen et al. | 57/139 |
| 3,078,542 | 7/1959 | McFarren et al. | 28/72 |
| 3,156,028 | 11/1964 | Weiss et al. | 28/72 |
| 3,275,720 | 9/1966 | Ohsol | 264/54 X |
| 3,345,718 | 10/1967 | Hollihan et al. | 28/1 |
| 3,406,436 | 11/1965 | Clarke et al. | 28/72 |
| 3,425,107 | 9/1966 | Matsui et al. | 28/1 |
| 3,619,874 | 1/1970 | Li et al. | 28/1.5 |
| 3,984,515 | 10/1976 | Mommaerts et al. | 264/45.5 X |
| 4,182,735 | 1/1980 | Costa, Jr. et al. | 264/54 |

FOREIGN PATENT DOCUMENTS

| | | |
|---|---|---|
| 2148588 | 9/1980 | European Pat. Off. |
| 1221488 | 2/1971 | United Kingdom |
| 1296710 | 11/1972 | United Kingdom |
| 1316465 | 5/1973 | United Kingdom |
| 1318964 | 5/1973 | United Kingdom |

OTHER PUBLICATIONS

Chem. Abstract 90:24692m (1979) of Japanese Kokai 78,106,770.

*Primary Examiner*—Jan Silbaugh
*Attorney, Agent, or Firm*—Gus T. Hampilos; Gerhard H. Fuchs

[57] ABSTRACT

Crimped foamed fibers are produced by a process which eliminates any mechanical deformation steps. The process comprises the step of forming foamed fibers having a plurality of randomly arranged cells distributed asymetrically over a given cross section and occupying at least about 10% of the cross sectional area of the fiber, and heating the foamed fibers while maintaining the fibers under no load condition to produce a crimped foamed fiber. The crimped foamed fibers are used in apparel, carpet fibers, thermal insulation, acoustic and filtration.

11 Claims, 15 Drawing Figures

SELF-CRIMPED FOAMED FIBERS

This application is related to U.S. application Ser. No. 490,070, "Producing Foamed Fibers", to Li et al., filed Apr. 29, 1983, now U.S. Pat. No. 4,562,022, commonly assigned.

BACKGROUND OF THE INVENTION

The present invention relates to processes for forming "self-crimped" foamed fibers, and especially to such processes comprising the steps of forming foamed fiber(s) having a plurality of randomly arranged closed and/or open cells distributed asymetrically over a given cross section of the fiber(s), and heating the fiber(s), while preferably maintaining the fiber(s) under a no load condition, to produce crimped, foamed fiber(s). The invention is also directed to novel foamed fiber which is self-crimping, crimped fiber produced by the process, and products employing the novel fiber.

Foamed thermoplastic (and especially polyamide) fibers have been produced, especially for the purpose of being broken (fibrillated) into 3-dimensional structures of interrelated fiber elements. See, for example, U.K. Patent Specification Nos. 1,316,465 (Changani), 1,221,488, 1,296,710, and 1,318,964.

Foamed polyester and polyamide fibers for textile applications are disclosed in DOS No. 2,148,588 (Apr. 5, 1973) (See Example 7). See also Chem. Abstract 90:24692m (1979) of Japanese Kokai No. 78,106,770.

Hollow fibers, also known in the art, contain elongated voids extending long distances or the entire length of the fiber in the longitudial direction. These fibers contain large void volumes and find use in thermal insulation. The elongated voids are generally produced by the use of a modified spinning die.

Crimped fibers are produced by feeding fibers into stuffer tubes and subjecting them to heat and pressure. More specifically, such processes include the step of feeding fibers into a heated tube at a rate higher than the take-up rate of the fibers from the tube to form a "plug" in the tube, the plug being mechanically deformed fibers which constitute the crimped fiber products. See, for example, U.S. Pat. Nos. 3,406,436 and 3,078,542.

Other mechanical deformation processes for forming crimped fibers are also known. U.S. Pat. No. 3,345,718 discloses a process of mechanically deforming fibers by pressing them between pressure rollers. U.S. Pat. No. 3,619,874 and patents cited therein disclose the use of a blade to plastically deform the fiber to produce crimped products. U.S. Pat. No. 3,009,309 discloses a process wherein fibers are heated, fluid jet twisted, quenched and subsequently back twisted to produce crimped fibers. In U.S. Pat. No. 3,156,028, heated fibers are jet propelled onto a textured surface to mechanically deform the fibers to match the working surface contour.

Multicomponent fibers have been used to produce crimped fibers without the need for mechanical deformation. These fibers comprise components having a different thermal shrinkage properties such that when the fiber is subjected to heat, it will crimp due to the different shrinkage characteristic of each component. See, for example, U.S. Pat. No. 3,425,107.

We have discovered novel self-crimping foamed fibers which require no mechanical deformation in order to crimp. To that end, we have discovered a novel process for crimping the foamed fibers which uses only heat to enhance the production of and set the crimps in the foamed product. The crimped, foamed fibers produced by our process can be used, for example, in apparel and carpet, and as thermal insulation, filter material and acoustic insulation.

SUMMARY OF THE INVENTION

The present invention is directed to a method of forming crimped foamed fibers comprising the steps of:

(a) forming a foamed fiber of an effective cross sectional area having a plurality of randomly arranged cells distributed asymetrically over an effective cross section of the foamed fiber taken substantially normal to the longitudial axis of the foamed fiber the minimum cross-sectional area occupied by the cells is at least about 0.1A, where A is the effective cross-sectional area of the foamed fiber; and (b) heating the foamed fiber under conditions sufficient to produce a crimped foamed fiber having at least one crimp per inch, the cross sectional area of the crimped foamed fiber being no more than about 10% greater than the effective cross sectional area of the foamed fiber prior to the heating step.

The present invention is also drawn to foamed fibers having a plurality of randomly arranged cells distributed asymetrically over a given cross sectional area of the fiber, the given cross section being taken substantially normal to the longitudial axis of the foamed fiber. The cells occupy at least about 10% of the cross sectional area of the foamed fiber. The cell size is between about $0.1\mu$ and about $50\mu$ in effective diameter. The most preferred self-crimping foamed fibers have a trilobal cross section.

DETAILED DESCRIPTION OF THE INVENTION

Figure 1:
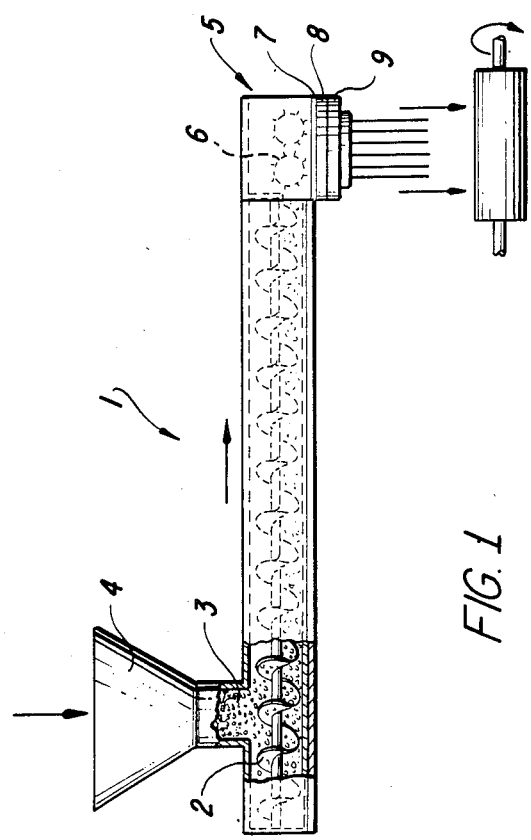
FIG. 1 is a schematic representation of an apparatus employed in forming the novel foamed fibers.

The process of the present invention involves the initial step of extruding a polymer melt containing, or having dissolved or dispersed therein, a blowing agent which is a decomposable compound or a dissolved gas. The polymer may be any of a variety of conventional thermoplastics used in fiber production: polyesters such as polyethylene terephalate; polyamides such as nylon 6, nylon 6/6, nylon 4/6 and nylon 6/12; polyolefins; poly (vinyl chloride); polystyrenes; and blends thereof.

The preferred thermoplastics for use in the present invention are polyamides, especially nylon 6 and nylon 6/6. The polymers should be of fiber-forming molecular weight, a term well understood in the art. In the case of nylon 6 and nylon 6/6, a generally acceptable number average molecular weight is at least about 10,000.

The blowing agent may be a compound dissolved or dispersed in the molten polymer which, before reaching the spinning temperature, decomposes to form gases such as carbon dioxide, nitrogen, carbon monoxide or mixtures thereof. Materials which totally decompose to produce gaseous products such as nitrogen, ammonia, carbon dioxide, carbon monoxide and water vapor, or combination of these are preferred. For example, azodicarbonamide decomposes to form nitrogen, carbon dioxide and ammonium in a 6:3:1 molar ratio. Azodicarbonamide, ethylene carbonate and oxalic acid are among the preferred materials, with oxalic acid, a blowing agent sold under the name FICEL ®, (an azodicarbonamide) and Expandex 5PT (a 5-phenyletrazole, releasing $N_2$ only) being most preferred. Less preferred, but suitable, are materials such as alkali metal carbonates and bicarbonates which decompose to form carbon dioxide and at least one non-volatile by-product, or, for example, other sodium salts.

The blowing agent may also be a normally gaseous or volatile compound, such as a fluorocarbon or water mixed or injected into the polymer melt before or during extrusion. Examples of such blowing agents include carbon dioxide, nitrogen, noble gases, dichlorodifloromethane trichlorotrifloroethane, water and volatile hydrocarbons, with nitrogen being the preferred blowing agent.

The decomposition temperature of the decomposable compound and boiling point of the normally-gaseous or volatile compound should be selected to assure that cells form in the polymer melt at the spinning temperatures at the outlet of the spinnerette (as the pressure drops). These cells should not collapse or redissolve in the extended fiber prior to polymer solidification.

The polymer melt will also include a nucleating agent such as talc, silica (powdered or fumed), or magnesium or calcium carbonate. The nucleating agent may be premixed with the decomposable compound as is the case of azo-compounds premixed with silica and sold by BFC Chemicals Inc., of Wilmington, Del. as FICEL ® EPA, EPB, EPC and EPD nucleating blowing agents. Alternatively, the nucleating agents may be separately mixed with the solid or molten polymer.

Additionally, the polymer melt will also include a surfactant or other additive such as caprolactam, or ethylene glycol. These materials have the general effect of controlling the size of the cells formed in the fibers, and when added are normally provided in amounts between about 3:1 to 1:1 (ratio of additive to blowing agent).

The concentration of the blowing agent or the decomposable compound in the polymer must be maintained above a certain amount in order to yield a sufficient number of cells to produce "self-crimping" foamed fibers. The specific concentration is dependent upon a variety of factors including the degree of decomposition of the agent, solubility of the gas(es) in the polymer, amount of nucleating agent, jet velocity and spinnerette design, among others, and can be determined by routine experimentation upon reviewing the disclosure herein and viewing the cross sectional area of the fiber products to determine whether at least about 10% of a given cross sectional area of the fiber exists as cells (voids, open or closed). For example, the amount of oxalic acid supplied to the polymer melt should be above about 0.2% by weight. With FICEL ® EPA, the amount of blowing agent should be at least about 0.3% by weight, and with Expandex 5PT at least about 0.2% by weight. Ordinarily, the nucleating agent should be maintained at about 0.2% by weight or more. Generally, an azodicarbonamide silica concentration ratio of about 2:1 or an oxalic acid/talc concentration ratio of about 2:1 is preferred. Furthermore, when a surfactant or other additive is included, it should be present in the melt at least about 0.2% by weight.

Spinning apparatus used in practicing the forming step of our process may be conventional extrusion apparatus for spinning ordinary fibers of the same polymer with minor modifications. Thus, for example, in spinning nylon 6 fibers, ordinary powder or pellet feed systems extruder and spinnerettes may be used. The spinnerette may have any number of apertures. Each aperture may have various L/D (length to diameter) ratios and various cross-sectional shapes (e.g., circular, Y-shape, dog-boned, hexalobal, and preferably trilobally-shaped). Regardless of the shape used, the effective diameter (in the case of a circle, an equivalent dimension giving the same cross-sectional area for other shapes) may vary widely from about 0.1 mm to about 2 mm, with an effective diameter between about 0.1 and about 1.0 mm being preferred and between about 0.1 and about 0.3 being more preferred. Preferred L/D ratios for the present invention are between about 30:1 and about 1:1, the lower range of which is substantially less than that normally used for spinning polyamide fibers. The preferred modification is the employment of screen pack(s) as disclosed in application Ser. No. 490,070, filed Apr. 29, 1983 which is hereby incorporated by reference. Preferably, the smallest screen should be between about 20 mesh/in and about 400 mesh/in. Most preferably, we employ an eight layered screen pack comprising a 90 mesh top layer, followed by two 200 mesh layers, followed by two 400 mesh layers, followed by two 200 mesh layers, followed by a 90 mesh bottom layer.

A random arrangement of cells which occupy a minimum percentage of a given cross-sectional area and which are distributed asymmetrically over the given cross-sectional area are critical features of the invention. We have discovered that the foamed fibers, to exhibit the self-crimping effect, must include cells which occupy at least about 10% of the cross-sectional area of the fiber (i.e., about 0.1 A, where A is the effective cross sectional area of the fiber) and which are asymmetrically distributed over the cross-sectional area of the fiber. This percentage of cells with asymmetric distribution will insure that the fiber, upon heating under a no load condition, will show at least one crimp per inch. A crimp as defined herein means any location along the major axis of the fiber at which the major axis exhibits a change in direction. The value of one crimp per inch is generally recognized as the minimum amount of crimping which defines a crimped fiber. Usually, the self-crimping fibers will exhibit at least about 5 crimps per inch, and fibers with at least 10 crimps per inch are preferred. We have produced fibers having at least about 20 crimps per inch.

The size (effective diameter) of the cell varies widely depending upon process condition. Ultimately, the cells may vary from $0.1\mu$ in effective diameter to about $50\mu$ in diameter. Generally, the cell size is in between $1\mu$ to about $20\mu$. Preferably, the cell size is at least about $1\mu$, and most preferably between about $1\mu$ and about $10\mu$.

An additional operating parameter which affects cell size in the fiber is the cooling rate of the polymer melt. Ordinarily, the cells will contain (for example) nitrogen, carbon dioxide or mixtures thereof and may contain other by-products of the blowing compound decomposition (e.g., ammonia). They may also contain other volatile materials which are added to the melt (e.g., fluorocarbons). Generally, the higher the cooling rate, the smaller the cross-sectional area of a given cell. Moreover, the higher the cooling rate, the lower the migration of bubbles to the surface of the fiber and the lower the amount of coalescence of individual bubbles. Of course, the optimum cooling rate of the polymer melt is dependent upon the specific characteristics desired for the final product. Moreover, the quench temperature should be one at which the molten fibers solidify. For our invention, a cooling rate of between about 4° C./sec and about 600° C./sec may be employed for a polyamide to produce a foamed fiber exhibiting the self-crimping effect. Generally, the cooling rate for any polymer would be at least 4° C./sec with the upper limit being dependent on final properties desired. Consequently, the quench temperature is generally about 10° C. to about 30° C., and is preferably effected by passing air over the surface of the fibers as they leave the spinnerette.

As the melt is quenched, it is normally drawn so as to control the diameter (or the denier) of the fiber to a desired degree. Because of the high viscosity of most fiber-forming polymer materials, it is conventional to extrude through spinnerette apertures of major cross-sectional dimension much larger than the desired ultimate fiber dimension mentioned. Furthermore, since, once the molten foamed fiber has solified it is relatively difficult to draw to a large extent (e.g., in some instances more about 20:1 normally more than about 5:1) the most appropriate place to draw to control final denier is during the molten stage and the quenching operation. In the present process, melt drawing at that stage may be between about 5:1 and about 250:1; and, at least in the case of polyamides, is preferably between about 20:1 and about 100:1. As a result of the drawing step, there may be some tendency for cells to elongate in the longitudinal direction.

The foamed fibers produced by our process have very good physical properties as shown (for nylon 6) in Table 1.

duced by out process are foamed fibers of trilobal cross-section. Our process operates generally, to produce foamed fibers having a denier of 1 and about 100 (preferably between about 1 and about 40, more preferably between about 1 and about 30, and most preferably between about 3 and 28). Because of the presence of cells, the density of such fibers will normally be between about 0.7 g/cc and about 0.95 g/cc (as compared to a range of about 1.1 g/cc to about 1.4 g/cc for the base polymer). Accordingly, since denier is based upon weight, lower denier fibers of the same cross-sectional area are created.

The production of cells is affected by the jet velocity of the polymer through the spinnerette (throughput rate of polymer through the spinnerette in length/sec). Ordinary, jet velocities range from about 2 cm/sec to about 50 cm/sec, with 10-35 cm/sec being preferred.

The heating step of the process may be conducted under a no load condition. This is an additional novel feature of our process. A no-load condition is defined as a condition of exposure of the foamed fibers to heat sufficient for the foamed fiber to yield enhanced crimping while maintaining the foamed fiber under a load (compressive or tensile) less than about 0.15 g/denier, preferably less than 0.05 g/denier, more preferably less than 0.01 g/denier, and most preferably less than about 0.002 g/denier. The heating step can be performed by a variety of methods. These methods include passing the foamed fiber over a heated member, passing the foamed fibers through a heated member, arranging the foamed fibers in a container and exposing the foamed fibers to heated fluid, or simply contacting the foamed fibers with a heated fluid. Other methods include subjecting the fibers to infrared heat, exposing the fibers to microwaves, or heating by dielectric effects. It should be noted that the heating step functions not only to enhance the crimping effect but also to set crimps which exist in the fiber after drawing.

Regardless of the method of heating employed, the foamed fibers should be exposed to a high enough temperature for a sufficient amount of time to produce a crimped foamed fiber having at least one crimp/inch. Of course, the exposure temperature and exposure time

TABLE

| Sample No. | % Shr.[1] at 140° C. | Density g/cc | Denier[4] dpf | Voids/X-section | | | Ten[2] g/d | UE % | DR[3] |
| | | | | No. | (ave) Size (μ) | % | | | |
|---|---|---|---|---|---|---|---|---|---|
| 1 | 11 | <0.85 | 23-R | 4 | 13 | 19 | 2.4 | 23 | 2.6 |
| 2 | 19 | <0.9 | 26-T | — | — | — | 1.4 | 76 | 2.3 |
| 3 | 14 | <0.9 | 14-T | — | — | — | 1.6 | 68 | 2.5 |
| 4 | 25 | <0.9 | 15-T | — | — | — | 1.9 | 62 | 2.5 |
| 5 | 14 | 1.0 | 17-T | — | — | — | 1.4 | 77 | 2.2 |
| 6 | 22 | 1.0 | 20-T | — | — | — | 2.0 | 64 | 2.1 |
| 7 | 22 | <0.90 | 29-T | 7.3 | 11.3 | 20 | 1.6 | 92 | 2.0 |
| 8 | 30 | <0.85 | 30-T | 12.0 | 10 | 24 | 0.9 | 72 | 2.0 |
| 9 | 23 | <0.90 | 32-T | — | — | — | 1.1 | 88 | 2.0 |
| 10 | 20 | <0.90 | 6.5-T | 11 | 3.4 | 15 | 1.6 | 42 | 1.9 |
| 11 | 9 | <0.85 | 20-T | 13 | 6.7 | 17 | 2.4 | 40 | 2.6 |

[1] % Shr. is the percent shrinkage of the fiber of given length (as compared to the original length) after exposure at 140° C.
[2] Ten is the tenacity of the fiber.
[3] DR is the draw ratio after solidification of the foamed fiber.
[4] R = round x-section; T = trilobal x-section.

For example, in product fibers having a denier (grams per 9,000 meters) of between about 1 and about 40 a representative cross-section of each filament may have between 2 and about 40 cells, visible under an optical microscope, amounting to at least about 10% of the cross-sectional area and arranged asymetrically. As can be seen in FIGS. 2-5, a preferred form of fibers proare dependent on the desired resultant fiber dimensional properties (such as the number of crimps/inch, the change in effective cross-sectional area due to the thermal shrinkage and the like). Additionally, the exposure time and temperature will depend on the fiber composition, fiber cross-sectional design, bubble distribution and bubble size and the like. Therefore, it is difficult to quantify the temperature and time exposure precisely. Nevertheless, upon reviewing Table 2 and the examples described herein, for particular embodiments of the invention, one can, by routine experimentation, adjust the parameters above the minimally acceptable parameters.

To produce (or enhance) and set the crimping of the self crimping foamed fibers, the fibers must be heated to at least the glass transition temperature of the polymer. As a general rule, the fibers should be exposed to a temperature of at least about 75° C., preferably at least about 90° C., and more preferably at least about 100° C. The exposure time is variable depending upon the time necessary to achieve fiber temperature. We prefer to expose the fibers to a given temperature for at least about for one minute in order to produce at least one crimp per inch. However, in order to avoid thermal shrinkage, which, in most instances is undesirable, the exposure temperature and exposure times must be adjusted to maintain a fiber temperature less than the temperature at which any significant thermal shrinkage will occur. Generally, the fiber temperature should remain below about $0.8\, t_m$, where $t_m$ is the melting point of the polymer.

Examples described hereinafter of self-crimping foamed fibers were spun using an apparatus of the type schematically illustrated in FIG. 1. As shown, a heated extruder 1 containing an extrusion screw 2 propels a mixture 3 of polymer, decomposable compound and a nucleating agent, fed in a hopper 4, toward a spinning apparatus 5. Within the spinning apparatus 5, positive displacement melt pump 6 feeds the molten polymer mixture through a distributor plate 7 and a screen pack 8 toward the spinner at 9. Additionally, a second screen pack could be employed above distributor plate 7. It should be understood, however, that extruders not employing the screen packs may also be used to produce self-crimping foamed fibers, although the use of screen packs is preferred.

EXAMPLE 1

Table 2 and Table 3 illustrate a variety of foamed fiber samples which were subjected to a crimping test to determine the percentage of crimp and the percentage of thermal shrinkage which is produced by the process of the present invention. The crimp test was conducted by providing a uniform size sample which was measured under a constant load of 0.5 g/d to determine its $L_0$ (original length). The foamed fiber was then subjected to 140° C. heat for 10 minutes and at the end of that time the fiber was loaded at 0.002 g/d to determine its length after crimp, i.e., $L_i$. The fiber was then subjected to a 0.5 g/d load to determine its $L_2$ (load length after crimp) which indicates the amount of thermal shrinkage during self-crimping. The percent crimp (% c) for each sample is indicated and was determined from the equation $$\%c = \frac{L_0 - L_i}{L_0} \times 100$$

The thermal shrinkage (TS) for each sample is also indicated and was determined from the equation $$\%TS = \frac{L_0 - L_2}{L_0} \times 100$$

As is apparent, fibers produced by our process exhibit a crimp of at least about 10% and a thermal shrinkage of usually no more than about 4.0%, although up to 10% thermal shrinkage may be acceptable for certain applications.

TABLE 2

| Sample No. | $L_0$ | $L_i$ | $L_2$ | % Crimp | Thermal Shrinkage (%) |
|---|---|---|---|---|---|
| 1 | 33.3 cm | 25.4 | 33.1 | 23.7 | 0.6 |
| 2 | 31.4 | 25.3 | 30.7 | 19.4 | 2.2 |
| 3 | 31.3 | 24.8 | 30.6 | 20.7 | 2.2 |
| 4 | 30.5 | 26.1 | 29.2 | 14.4 | 4.2 |
| 5 | 30.7 | 26.2 | 29.4 | 14.6 | 4.2 |
| 6 | 30.6 | 26.5 | 29.3 | 13.3 | 4.2 |
| 7 | 30.8 | 27.0 | 29.3 | 12.3 | 4.8 |
| 8 | 31.4 | 28.5 | 30.8 | 9.2 | 1.9 |
| 9 | 31.4 | 28.5 | 30.8 | 9.2 | 1.9 |
| 10 | 29.8 | 26.0 | 27.0 | 12.7 | 9.3 |
| 11 | 30.1 | 26.5 | 27.3 | 11.9 | 9.3 |
| 12 | 31.6 | 28.5 | 30.6 | 9.8 | 3.2 |
| 13 | 31.5 | 28.7 | 30.8 | 8.8 | 2.2 |

TABLE 3

| Sample No. | $L_0$ | $L_i(60)$[1] | $L_1(120)$[2] | $L_2$ | % TS | % C[3] |
|---|---|---|---|---|---|---|
| Heat 100° C. - 10 min. | | | | | | |
| A | 32.6 | 27.2 | 27.2 | 32.1 | 1.5 | 16.6 |
| A | 32.3 | 26.9 | 26.9 | 32.1 | 0.6 | 16.7 |
| B | 31.0 | 27.3 | 27.1 | 30.7 | 0.9 | 11.9 |
| B | 31.3 | 25.0 | 27.8 | 31.0 | 1.0 | 10.5 |
| Heat 120° C. - 10 min. | | | | | | |
| A | 32.5 | 26.2 | 26.1 | 32.1 | — | 19.4 |
| A | 32.4 | 24.8 | 24.8 | 32.0 | — | 23.4 |
| B | 30.7 | 26.5 | 26.5 | 30.2 | — | 13.7 |
| B | 30.8 | 27.3 | 27.4 | 30.4 | — | 11.4 |
| Heat 140° C. - 10 min. | | | | | | |
| A | 32.6 | 25.4–31.9 | | | 2.14 | 22.08 |
| A | 32.0 | 24.7–31.0 | | | 3.12 | 22.81 |
| B | 30.5 | 26.5–29.8 | | | 2.29 | 13.11 |
| B | 31.0 | 27.2–30.4 | | | 1.94 | 12.25 |
| Heat 160° C. - 10 min. | | | | | | |
| A | 31.9 | 25.0–31.2 | | | 2.19 | 21.63 |
| B | 31.4 | 24.4–31.4 | | | 0 | 22.29 |
| B | 31.1 | 26.9–30.4 | | | 2.25 | 13.50 |

[1] $L_i(60)$ is the length after crimp as measured at load after 60 minutes.
[2] $L_1(120)$ is the length after crimp as measured at load after 120 minutes.
[3] % C was measured after load at 60 minutes

EXAMPLE 2

Nylon pellets, coated with a blend of oxalic acid, caprolactam and talc in weight proportions of 0.25%, 0.5% and 0.25%, respectively, are extruded and drawn into a final denier of 75 deniers/5 filaments. The foamed yarn of uniform density of approximately 0.88 gm/cc was then slid over a heater block at 160° C. under very low tension (i.e., tension due to friction over the heated block only). The heated foamed yarn exhibited 5 to 10 crimps per inch.

EXAMPLE 3

Figure 2:
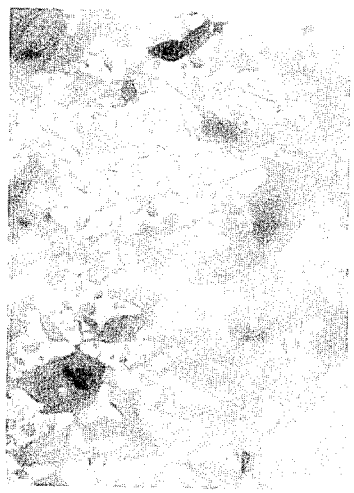
FIGS. 2 to 5 are photomicrographs of cross sections of different foamed fibers produced in accordance with the present invention.
Figure 6:
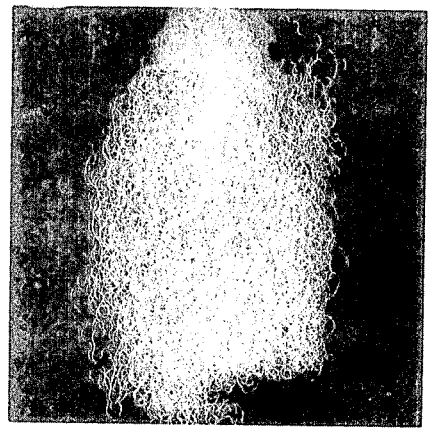
FIGS. 6 to 9 are photographs of the crimped fibers produced by heating the fibers shown in FIGS. 2–5 under a no load condition.

A blend of nylon$_6$ pellets, 0.2% MicroPflex ® 1200 (talc powders), 0.2% oxalic acid, and 0.4% caprolactam was melt spun using a screw-type extruder. The spinnerette used had 5 holes with a trilobal cross-section of 0.005 inch width × 0.020 inch length × 0.030 inch depth. After spinning, the foamed yarn was drawn at a ratio of 2.48:1 to produce a final density of about 0.90 gm/cc (as compared to the nylon 6 density of 1.14 g/cc. A 0.5 gm sample of the yarn was subjected to 130° C. heat for 2 minutes by suspending the sample from a rod in a hot air oven. As seen in FIG. 2, the foamed fiber exhibited 15–20% voids over the cross-sectional area of the fiber. As shown in FIG. 6, the fiber after being heated exhibited a large number of crimps per inch.

EXAMPLE 4

Figure 3:
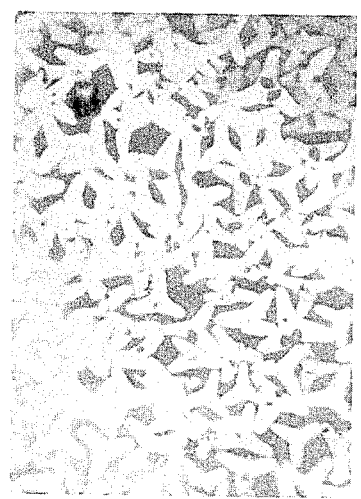
Figure 7:
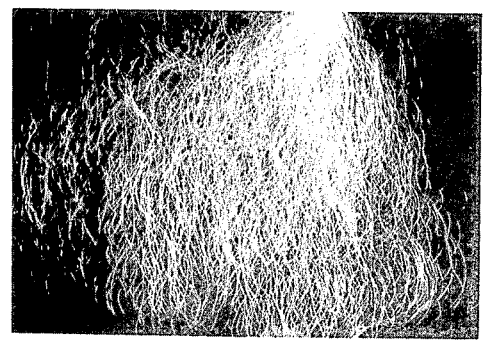

A blend of nylon$_6$ pellets, 0.2% coconut oil, 0.2% Multiflex ® MM (CaCO$_3$) and 0.15% oxalic acid were melt spun using a screw-type extruder. The spinnerette used had five holes with a trilobal crosssection of 0.005 inch width×0.020 inch length×0.030 inch depth. After spinning, the fiber was drawn at a ratio of 2.38:1. The foamed fiber product exhibited about 5% voids over the given crosssectional area of the foamed product. A 0.5 gram sample of the yarn was subjected to 130° C. heat for 2 minutes by suspending the sample from a rod in a hot air oven. As shown in FIG. 3 and as pictured in FIG. 7 the foamed fiber exhibited very little crimping. A comparison of Example 3 with this Example illustrates a critical aspect of applicants' invention, i.e., the need to produce a foamed fiber having at least about 10% voids over a given cross-sectional area of the fiber.

EXAMPLE 5

Figure 4:
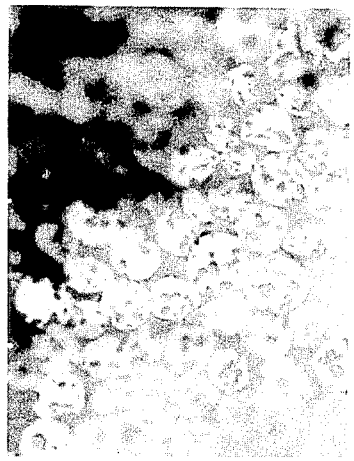
Figure 8:
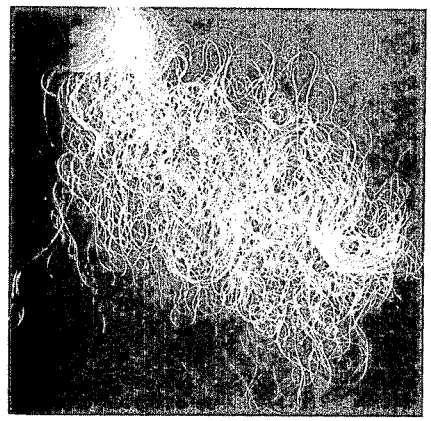

A blend of nylon$_6$ pellets, 0.3% Ficel ® EPA, 0.4% ethylene glycol was melt spun through an extruder having a spinnerette with six holes of 0.020 diameter×0.050 length, and which was not internally cooled. The foamed fiber product was then drawn at a ratio of 2.61:1. The foamed fiber density was approximately 0.85 g/cc. The denier of the yarn produced by this process was approximately 80/6 filaments. As shown in FIG. 4, the fibers had a plurality of large close cell bubbles asymmetrically distributed over the given cross-sectional area of the fiber. As illustrated in FIG. 8, the resultant fiber showed some crimping.

EXAMPLE 6

Figure 5:
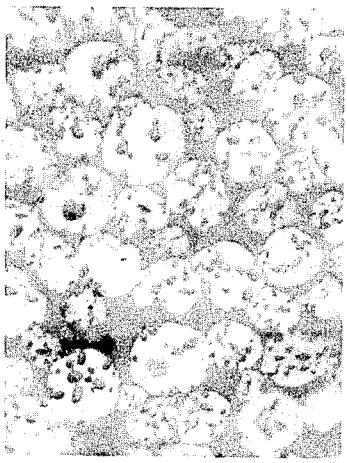
Figure 9:
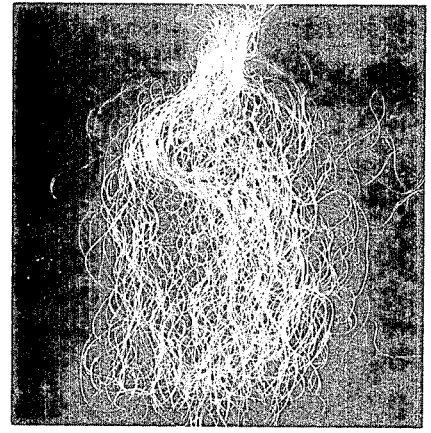

The blend of Example 5 was extruded through a screw-type extruder using the same spinnerette dimensions as in Example 5. However, the spinnerette was internally cooled to produce a product having a density of approximately 0.85 gm/cc. As shown in FIG. 5, the resultant fiber had a plurality of smaller cells distributed over a given cross-sectional area of the fiber as compared to the uncooled product of FIG. 4. As illustrated in FIG. 9, heating of the fiber at 130° C. for two minutes by suspending a 0.5 gram sample from a rod in a hot air oven yielded some crimping. This Example as compared to Example 4 illustrates that the more symmetric the cell distribution, the less degree of crimping. Note that the foamed fiber has a plurality of relatively more fine cells as compared to the cells in the cross-sectional area of the fiber of Example 4.

EXAMPLE 7

Figure 10A:
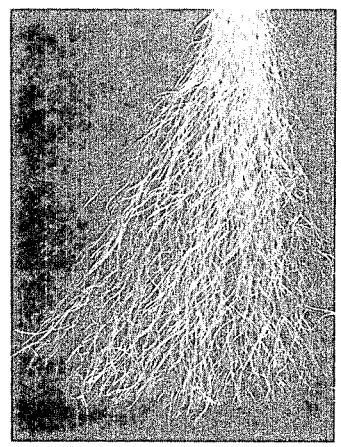
FIGS. 10a and 10b illustrate the effects of heating PET self-crimping foamed fibers at different temperatures.
Figure 10B:
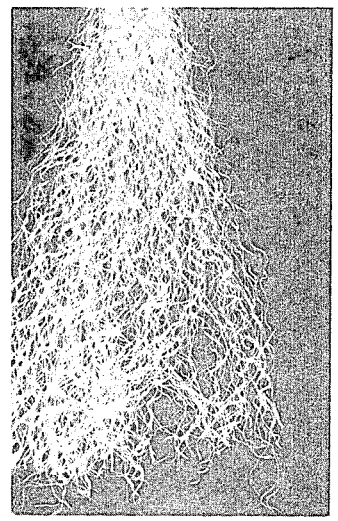
Figure 11C:
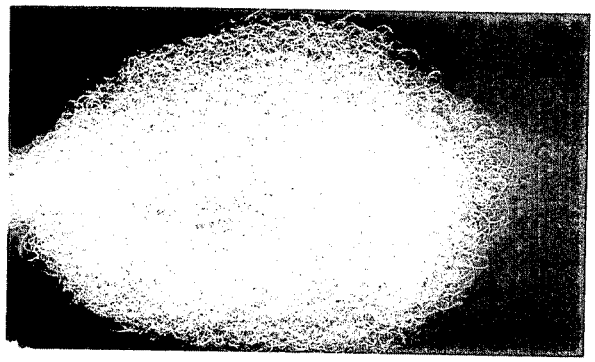
FIGS. 11a and 11d also illustrate the effects of heating nylon self-crimping foamed fibers at different temperatures.
Figure 11B:
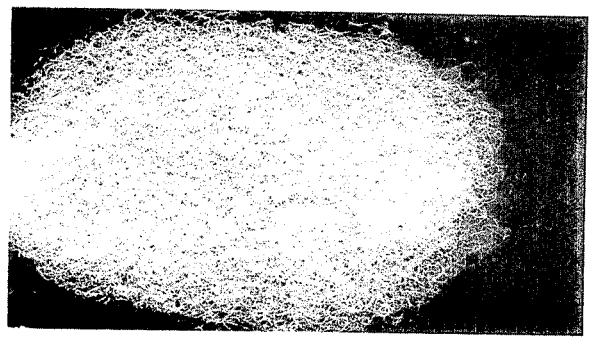
Figure 11A:
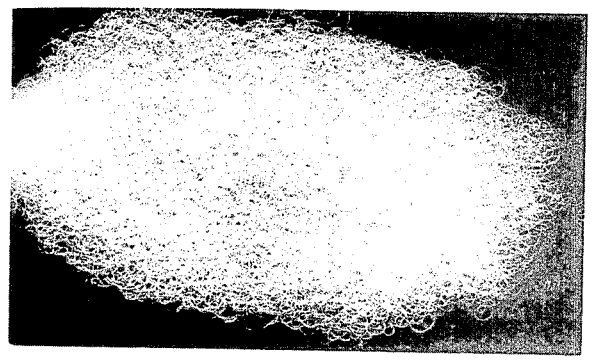
Figure 11D:
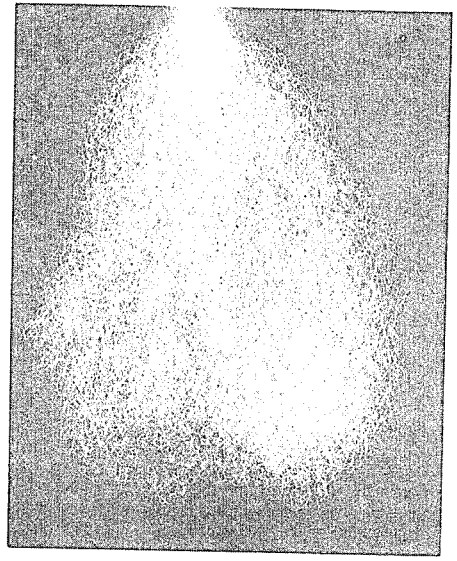

Polyethylene terephalate polymer (0.95 IV) was mixed with 0.2% talc, and 0.4% ethylene carbonate. The polymer blend was melt spun through a spinnerette having six holes of a round cross-section of 0.010 inch diameter×0.010 inch length. The foamed fiber product was drawn at 1.11:1 and exhibited a density of less than about 0.85 g/cc (as compared to a PET density of 1.385 g/cc). Samples of the foamed fiber were heated at two different temperatures, the first at 75° C. for two minutes and the second at 95° C. for two minutes. The results are illustrated in FIGS. 10a and 10b which show the 75° C. heated foamed fiber and the 95° C. heated foamed fiber, respectively. These figures illustrate that the higher the foamed fiber heating temperature, the higher the degree of crimping which will occur.

EXAMPLE 8

Samples of the foamed fiber produced by Example 2 were subjected to heating in a hot air oven at temperatures of 100° C., 130° C., 150° C. and 180° C. each for two minutes. As illustrated in FIGS. 11a–d, as the temperature of heating increased (100° C. for FIG. 11a, 130° C. for FIG. 11b, 150° C. for FIG. 11c and 180° C. for FIG. 11d), the degree of crimping increased.

EXAMPLE 9

A homogeneous blend of 100 parts of nylon 6 chips, 0.2 parts of MicroPflex ® (talc powders), 0.175 part of oxalic acid, 0.35 parts caprolactam and 0.2 parts of a silicon fluid (Dow Corning, Q1-8030) was blended and melt spun using a screw-type extruder with a length to diameter ratio of 21:1. The melt temperature and spinnerette temperature were maintained at 520° F. and 455° F., respectively. The spinnerette used had 20 holes with a trilobal cross-section of 0.004 inch width×0.010 inch length×0.010 inch depth. A crossflow air quenching system was used and the air temperature was about 22° C. The flow rate through the spinnerette was 23.4 gm/min. The screen pack was installed in front of the spinnerette plate consisting of one layer of 90 mesh plus four layers of 200 mesh plus one layer of 90 mesh screen.

The foamed yarn was drawn to a ratio of 1.88:1 and each filament exhibited a density of about 0.87 gm/cc. The foamed yarn had the following tensile properties: denier equal to 138/20, tensile modulus equal to 12.5 g/d, tenacity equal to 1.4 g/d, and elongation at break equal to 31.4%. The foamed yarn exhibited approximately 326 cells per 20 filament with asymmetric cell distribution. The cell sizes varied from about 1μ to about 5μ. If the foamed yarns were heated, each foamed filament would exhibit the self-crimping effect.

EXAMPLE 10

A blend of polyethylene terephthalate and FICEL ® in an amount equal to about 0.5% by weight was spun through a 6 hole circular cross-section spinnerette die to produce a foamed fiber product having a density of approximately 0.9 g/cc. The foamed fiber product was then drawn at a ratio of about 2.5:1 to produce 8.5 denier filament. The foamed product produced by this process is a self-crimping foamed fiber. The void size over a given cross-sectional area of the foamed fiber ranges from one micron to as much as ten microns. The total percentage of close cells is at least about 10% of the cross sectional area of the fiber. The properties of the foamed fiber product included tensile modulus of about 69 gm/denier, an ultimate tensile strength of about 2.1 g/d and an ultimate elongation to break of about 7.4%. The fibers upon heating to produce crimps illustrates an additional aspect of our invention; i.e., helical or coil-type crimps as opposed to prior art processes which normally exhibit sawteeth-type crimps.

EXAMPLE 11

A homogeneous blend of 100 parts of nylon 6 chips, 0.2 part of MicroPflex ® 1200 (talc) powders, 0.2 part of oxalic acid and 0.4 part of caprolactam was prepared. The blend was melt spun using a screw-type extruder with a length diameter ratio of 30:1. The barrel and spinnerette temperatures were maintained at 500° F. and 480° F., respectively. The screen pack consisted of eight layers, namely, 90 mesh+200 mesh+200 mesh+400 mesh+400 mesh+200 mesh+200 mesh+90 mesh. The spinnerette used has 5 holes with a trilobal cross-section for each hole. The trilobal has a dimension of 0.005" width×0.020" length×0.030" depth. The screw rpm was 20 while the flow rate was 12 gm/min. A cross flow air quenching system was used and the air temperature was 22° C. The foamed yarn of a density=0.84 gm/cc was spun and drawn under the following conditions:

| ROLL | TEMP. °C. | SPEED, fpm |
|---|---|---|
| #1 (take up) | 23° C. | 2,125 fpm |
| #2 (1st stage draw) | 150° C. | 2,348 fpm |
| #3 (2nd stage draw) | 23° C. | 5,277 fpm |

The total draw ratio of the foamed yarn was 2.48 X and and the drawn foamed yarn density was 0.90 gm/cc. The foamed yarn has the following tensile properties:
denier=75 denier/5 filament
tenacity=1.3 gpd
modulus=14 gpd and
elongation at break=37%
Each foamed filament consisted of approximately three cells, each cell having an equivalent diameter of about 10 microns. The degree of crimp, after treating in an hot air oven at 100° C. for 10 minutes, measured under 0.002 gpd load was ≈17% while the thermal shrinkage was only 1.5%. The combination of good self-crimp level and low thermal shrinkage is an important feature for self-crimped foamed yarns which are to be used in carpets, as filtration devices, and in making apparel.

We claim:

1. A method of forming self-crimped foamed fibers comprising the steps of:
   (a) melt spinning a foamed fiber of an effective cross-sectional area having a plurality of randomly-arranged cells of an effective diameter of at least about 1μ distributed asymmetrically over the effective cross-section of the foamed fiber taken substantially normal to the longitudinal axis of the foamed fiber, the minimum cross-sectional area occupied by the cells at least about 0.1A, where A is the effective cross-sectional area of the foamed fiber, the asymmetrical distribution of the randomly-arranged cells being such that the foamed fiber is capable of crimping under a no load condition; and
   (b) heating the foamed fiber under conditions sufficient to produce a crimped foam fiber having at least one crimp/inch, the cross sectional area of the crimped foamed fiber being not more than about 10% greater than the effective area of the foamed fiber prior to the heating step.

2. The method of claim 1 wherein the fiber is between about 1 denier and about 100 denier.

3. The method of claim 1 wherein the foamed fiber is heated to a maximum temperature of not more than about $0.8\ t_m$, where $t_m$ is the melting temperature of the polymer forming the foamed fiber.

4. The method of claim 1 wherein the conditions require maintaining the fiber under a load less than or equal to about 0.1 gram/denier.

5. The method of claim 3 wherein the fiber is exposed to a temperature of at least about 90° C. and the conditions require maintaining the fiber under a load less than or equal to about 0.1 gram/denier.

6. The method of claim 1 wherein the given cross-section of the fiber comprises three lobed portions.

7. The method of claim 1 wherein the crimped foamed fiber has at least about 5 crimps/inch.

8. The method of claim 1 wherein the foamed fiber is heated to a temperature of at least about the glass transition temperature of the foamed fiber polymer.

9. The method of claim 1 wherein a plurality of foamed fibers are formed and heated to produce a crimped foamed yarn.

10. The method of claim 1 wherein a plurality of fibers are formed and heated to produce a fiber batt.

11. A method of forming a self-crimped foamed fibers comprising the steps of:
   (a) melt spinning a foamed fiber of an effective cross-sectional area having a plurality of randomly-arranged cells distributed asymmetrically over the effective cross-section of the foamed fiber taken substantially normal to the longitudinal axis of the foamed fiber, the minimum cross-sectional area occupied by the cells is at least about 0.1A, where A is the effective cross-sectional area of the foamed fiber, the asymmetrical distribution of the randomly-arranged cells being such that the foamed fiber is capable of crimping under a no load condition; and
   (b) heating the foamed fiber under conditions sufficient to produced a crimped foam fiber having at least one crimp/inch, the cross sectional area of the crimped foamed fiber being not more than about 10% greater than of the effective area of the foamed fiber prior to the heating step.

* * * * *